United States Patent
Shan et al.

(10) Patent No.: US 10,562,248 B2
(45) Date of Patent: Feb. 18, 2020

(54) OPTICAL LENS COMPRISING A PROTECTIVE REMOVABLE FILM

(71) Applicant: ESSILOR INTERNATIONAL (COMPAGNIE GENERALE D'OPTIQUE), Charenton le Pont (FR)

(72) Inventors: Haifeng Shan, Dallas, TX (US); Richard Muisener, Basking Ridge, NJ (US); Gerald Fournand, Dallas, TX (US); Aude Lapprand, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 334 days.

(21) Appl. No.: 15/508,727

(22) PCT Filed: Sep. 4, 2014

(86) PCT No.: PCT/IB2014/002101
§ 371 (c)(1),
(2) Date: Mar. 3, 2017

(87) PCT Pub. No.: WO2016/034914
PCT Pub. Date: Mar. 10, 2016

(65) Prior Publication Data
US 2017/0282470 A1    Oct. 5, 2017

(51) Int. Cl.
*B29D 11/00* (2006.01)
*G02B 1/14* (2015.01)

(52) U.S. Cl.
CPC .. *B29D 11/00009* (2013.01); *B29D 11/00865* (2013.01); *G02B 1/14* (2015.01)

(58) Field of Classification Search
CPC .... G02B 1/14; G02B 1/043; B29D 11/00009; B29D 11/00865; B24B 9/146
See application file for complete search history.

(56) References Cited

U.S. PATENT DOCUMENTS

| | | | |
|---|---|---|---|
| 4,410,563 A | 10/1983 | Richter et al. | |
| 6,183,872 B1 | 2/2001 | Tanaka et al. | |
| 6,277,485 B1 | 8/2001 | Invie et al. | |
| 2007/0141358 A1 | 6/2007 | Jallouli et al. | |

FOREIGN PATENT DOCUMENTS

| | | |
|---|---|---|
| EP | 0203730 | 12/1986 |
| EP | 0614957 | 9/1994 |
| EP | 0749021 | 12/1996 |
| EP | 0844265 | 5/1998 |
| EP | 0933377 | 8/1999 |
| EP | 1392613 | 3/2004 |
| EP | 1664906 | 6/2006 |
| EP | 2078977 | 7/2009 |
| FR | 2824821 | 11/2002 |
| FR | 2860303 | 4/2005 |
| JP | H07-101007 | 4/1995 |
| JP | 2005187936 | 7/2005 |
| JP | 2006-327058 | 12/2006 |
| JP | 2009-518675 | 5/2009 |
| JP | 2011-042108 | 3/2011 |
| WO | WO2003/011551 | 2/2003 |
| WO | WO2008/053020 | 5/2008 |
| WO | WO2008/141981 | 11/2008 |
| WO | WO2014/102271 | 7/2014 |
| WO | WO2014/102298 | 7/2014 |

*Primary Examiner* — Mathieu D Vargot
(74) *Attorney, Agent, or Firm* — Norton Rose Fulbright US LLP

(57) ABSTRACT

The invention concerns an optical lens comprising (i) a temporary coating at least partially covering a surface of the lens, said temporary coating comprising an outermost layer mechanically degradable through friction and/or contact; (ii) a removable film having opposite first side and second sides which adhere to said outermost layer through its first side, wherein—the first side of the film has a roughness Rq lower than 750 nm and the first side of the film has a surface energy lower than 38 $mJ/m^2$.

18 Claims, No Drawings

OPTICAL LENS COMPRISING A PROTECTIVE REMOVABLE FILM

CROSS-REFERENCE TO RELATED APPLICATIONS

This application is a national phase application under 35 U.S.C. § 371 of International Application No. PCT/IB2014/002101 filed 4 Sep. 2014, the entire contents of which is specifically incorporated by reference herein without disclaimer.

The present invention generally relates to an optical lens, more particularly to an ophtalmic lens, having a main face comprising a temporary coating, typically an edging enhancing temporary coating, mechanically degradable through friction and/or contact, being in turn coated with a removable film for protecting it from such degradation, which after removal of the protecting removable film does not alter the integrity and the properties of the temporary coating and in particular leaves an edging enhancing temporary coating in a state allowing for satisfactory edging of the optical lens.

An optical lens, more particularly an ophthalmic lens, results from a sequence of moulding and/or surfacing/smoothing steps determining the geometry of both convex and concave optical surfaces of the lens, followed by appropriate surface treatments.

The last finishing step of an ophthalmic lens is the edging operation consisting in machining out the edge or the periphery of the glass so as to shape it according to the required dimensions to adapt the lens to the glass frame wherein it is to be arranged.

Edging is generally done on a grinding machine comprising diamond wheels that perform the machining step as defined hereinabove.

The lens is held, upon such an operation, by axially acting blocking members.

The relative motion of the lens with respect to the grinding wheel is monitored, generally digitally, so as to provide the desired shape.

As it appears, it is mostly imperative that the lens be firmly maintained upon such a movement.

To this end, before the edging operation, a lens-blocking step is performed, i.e. a holding means or chuck is positioned on the convex surface of the lens.

A holding pad, such as a self-adhesive pad, for example a two-sided adhesive, is arranged between the chuck and the convex surface of the lens.

The so arranged lens is positioned on one of the above-mentioned axial blocking members, the second axial blocking member clamping then the lens on the concave surface thereof by means of an abutment, generally made of an elastomer.

Upon the machining step, a tangential torque stress is generated on the lens, which may result in a rotation of the lens relative to the chuck if the lens holding means is not sufficiently efficient.

The good holding of the lens mainly depends on the good adhesion at the holding pad/convex surface interface of the lens.

In an embodiment, the holding means is a chuck that is adhering to the lens using a liquid curable adhesive located between the chuck and the surface of the lens as in the OBM™ process of SatisLoh. The chuck/acorn element can also be integrally molded to the lens.

In the following description, the blocking will be described in reference to the embodiment with the self-adhesive pad.

The last generation of ophthalmic lenses most often comprises an organic or mineral outer layer modifying the surface energy, for example hydrophobic and/or oleophobic coatings such as anti-fouling coatings.

These are most often materials of the fluorosilane type reducing the surface energy so as to avoid the adhesion of fatty stains, which are thus easier to be removed.

Such a surface coating may be so efficient that the adhesion at the pad/convex surface interface may thereby be altered, making difficult satisfactory edging operations, in particular for polycarbonate lenses, the edging of which generates much larger efforts in comparison with other materials.

Although previously described with the edging machine this problem, even though reduced, appears also with cutting machine (cutting tools like cutters or drills, for example with the national optronics 7E machine or Mister Blue).

The consequence of a badly performed edging operation is the pure and simple loss of the lens.

That is why it is advantageous to deposit on the outer coating a temporary layer, imparting a surface energy at least equal to 15 mJ/m$^2$, in particular a fluoride, oxide, metal hydroxide layer, and preferably, a MgF$_2$ protective layer, as well as a marking ink or a resin being the binder of such marking inks, such as disclosed in French Patent No. 2824821. The temporary layer gives good adhesion at the holding pad/convex surface interface, and therefore leads to satisfactory edging performance. In this application surface energy is defined as described in experimental part.

Typically, optical lenses, more particularly, ophthalmic ones, comprising optionally one or more conventional functional coatings, such as a primer coating improving the adhesion of other functional layers, an anti-abrasion coating and a anti-reflection coating, and comprising a hydrophobic and/or oleophobic surface coating, more particularly an anti-fouling one, in turn being at least partially coated with an edging enhancing temporary coating, are each stored and delivered in paper bags innerly provided with a protective coating. The bags each containing a lens may be stacked onto one another during handling, storage or shipping.

It has been found that, due to frictions or even simple pressures, during storage or handling of such lenses, when in their respective bags, the temporary coating is altered, in particular where coating comprises an outer metal fluoride layer and more specially a MgF$_2$ temporary layer, in such a manner that could lead to a loss of adhesion with the holding pad during the edging operation. Such an alteration can be observed visually, more specially in the case of a MgF$_2$ outer layer, through the occurrence on the temporary outer layer of marks which are visible to the naked eye.

In order to overcome the above mentioned problem, it has been proposed to cover the temporary coating with a peelable electrostatic film, such as a highly plasticized polymer film.

Such a solution is fully disclosed, for example, in EP-1664906.

Although the above electrostatic films have been satisfactory, they have a tendency in time to deteriorate the edging enhancing temporary coating resulting in at least a partial removal of the edging enhancing temporary coating when peeled off.

Further, if a modification is made on a classical outer coating of the lens (hydrophobic and/or oleophobic surface coating) which leads to a further reduction of the surface energy of this layer, for example the presence of two superposed hydrophobic layers it is likely that the edging enhancing temporary coating will have a lower adhesion with this outer coating. Consequently, in that case, there is a high risk that using a peelable electrostatic film according to the prior art, the edging enhancing temporary coating will be completely removed when peeling off the protective removable film prior to the lens edging operation.

Thus, the aim of the present invention is to provide an alternative to the prior art protective electrostatic film, and in particular to provide protective films with sufficient adhesion to the temporary coating, preferably an edging enhancing temporary coating, so as to protect this coating from mechanical degradation during storing and handling steps and which can be peeled off without impairing the integrity and the properties of the temporary coating.

This is achieved according to the invention by providing a removable plastic film, preferably with a low plasticizer content, having specific roughnesses and surface energies exhibiting sufficient adhesion to the temporary coating for an effective protection of the temporary coating and which can be safely and easily peeled off from the temporary coating without impairing its integrity and properties.

The removable plastic film is preferably a deformable film, so that it conforms to lens curvature and retains such deformation without the application of any external force.

Such a conformation can be obtained by using plastic films with low Young's modulus and a low thickness.

Ease of conformation of protective plastic film can also be improved using specific shapes for the film, such as a daisy shape as disclosed in EP-1644906.

Typically, the film is placed at the center of the lens with a sufficient size to protect the underneath surface of the lens, in particular an edging enhancing temporary coating.

Thus, the present invention concerns an optical lens comprising:
(i) a temporary coating at least partially covering a surface of the lens, said temporary coating comprising an outermost layer mechanically degradable through friction and/or contact; and
(ii) a removable film having opposite first and second sides and which adheres to said outermost layer through its first side, wherein
the first side of the film has a roughness Rq lower than 750 nm, and
the first side of the film has a surface energy lower than 38 $mJ/m^2$.

According to the invention, the optical lens comprises a temporary coating comprising an outermost layer mechanically degradable through friction and/or contact.

The temporary coating can be a monolayer coating (thus constituting the mechanically degradable outermost layer) or a multilayer coating whose outermost layer is mechanically degradable.

According to the invention, by mechanically degradable through friction and/or contact, it is meant that the outermost layer of the coating is removed after having been subjected to a dry wiping, consisting in 5 to and fro movements on the wiping area with a Wypall L40® cloth from the KIMBERLY-CLARK Corporation, while maintaining a 3 $kg/cm^2$ pressure.

In a specific embodiment of the invention, the temporary coating is an edging enhancing temporary coating such as disclosed in EP-1392613.

In a preferred embodiment, the temporary outer coating comprises a mineral outer layer, and more particularly, a metal fluoride or a blend of metal fluorides, a metal oxide or a blend of metal oxides or a metal hydroxide or a blend of metal hydroxides as well as a blend of such fluorides, oxides and hydroxides. More preferably, the outer layer of the temporary protective coating consists of a metal fluoride, a metal oxide or a metal hydroxide, or mixtures thereof.

Examples of fluorides include magnesium fluoride ($MgF_2$), lanthanum fluoride ($LaF_3$), aluminium fluoride ($AlF_3$) and cerium fluoride ($CeF_3$). The particularly preferred material is $MgF_2$.

Useful oxides are magnesium oxide (MgO), calcium oxide (CaO), titania ($TiO_2$), alumina ($Al_2O_3$), zirconia ($ZrO_2$), or praseodymium oxide ($Pr_2O_3$). Mixtures of alumina and praseodymium oxide are suitable. A particularly suitable material is PASO2 from Leybold Corporation. Silicon oxide, especially silica can also be used. The particularly preferred material is MgO.

Examples of metal hydroxides comprise $Mg(OH)_2$, $Ca(OH)_2$ and $Al(OH)_3$, preferably $Mg(OH)_2$.

The most preferred outer layer of the temporary protective coating consists of a bilayer of $MgF_2$ and MgO deposited in this order.

The temporary layer can be deposited using any suitable conventional method, preferably vacuum deposition.

When it is made of a mineral material, the thickness of the temporary protective coating is preferably lower than or equal to 100 nm, preferably lower than or equal to 50, and generally ranges from 1 to 50 nm, and more preferably from 5 to 50 nm.

Generally, if the protective coating thickness is too low, there is the risk that the surface energy will be insufficiently modified.

If, on the contrary, the temporary coating thickness is too high, more particularly for essentially mineral coatings, the inventors have found out that there is the risk that mechanical stresses could occur within the coating, which is detrimental to the expected properties.

When it is made of an organic material, the thickness of the temporary coating preferably ranges from 5 to 150 µm.

As an alternative to the above-mentioned mineral materials, one can use an organic ink which may be used for marking progressive ophthalmic glasses and/or a resin chosen from resins which may form the binding agent of an ink capable of being used for marking progressive ophthalmic glasses. Resins of the alkyd type are particularly suitable.

The temporary outer coating can be monolayered or multilayered, in particular bi-layered.

The layers can all be mineral or some of them can be organic and the others mineral. In the case of a bilayer temporary coating, an organic layer is preferably deposited onto a mineral layer. Said mineral layer is preferably 5 to 200 nm thick and said organic layer is preferably 0.2 to 10 µm thick.

In another embodiment of the invention, the temporary layer comprises a stack of two mineral layers, preferably a first layer of $MgF_2$ onto which is deposited a second layer of MgO. It is also possible to obtain a graded temporary protective layer, for example by evaporating part of a first material, then starting evaporation of a second material, and then stopping evaporation of the first material, so that there is obtained a gradient, the composition of which varies from pure first material to pure second material away from the substrate.

In a particularly preferred embodiment, the temporary coating comprises a layer comprising a metallic fluoride and a layer comprising a material selected from the group of metallic oxides, metallic hydroxides or mixtures thereof deposited on said layer of metallic fluorides.

In preferred embodiments, the temporary coating is formed onto a hydrophobic and/or oleophobic coating.

Such hydrophobic and/or oleophobic coatings are well known in the art and have been extensively disclosed in the following patents U.S. Pat. No. 4,410,563, EP-0203730, EP-749021, EP-844265, EP-933377.

Silane-based compounds bearing fluorinated groups, more particularly perfluorocarbon or perfluoropolyether group(s) are most often used.

Examples may include silazane, polysilazane or silicon compounds comprising one or more fluorinated groups such as those previously mentioned.

A known method comprises depositing onto the anti-reflection coating compounds having fluorinated groups and Si—R groups, wherein R represents a —OH group or a precursor thereof, preferably an alkoxy group. Such compounds are able to perform, at the anti-reflection coating surface, either directly or after hydrolysis, polymerization and/or cross-linking reactions.

Applying compounds for decreasing the surface energy of the glass conventionally occurs through dipping in a solution of said compound, through centrifugation or through vapour phase deposition, amongst others. Generally, the hydrophobic and/or oleophobic coating is less than 10 nm thick and preferably less than 5 nm thick.

The invention is preferably carried out with lenses comprising a hydrophobic and/or an oleophobic surface coating imparting a surface energy lower than 14 mJ/m$^2$ and more preferably equal to or lower than 12 mJ/m$^2$.

The temporary coating would generally increase the surface energy of the lens up to a value at least of 15 mJ/m$^2$.

It can be applied on an area covering the whole of at least one of the two sides of the lens or only on the area intended to be in contact with the holding pad of said lens.

More precisely, it is usual to deposit the holding pad, associated with the chuck, on the lens convex side. It is therefore possible to cover with the protective coating the whole convex side or, alternatively, only a central area of the convex side, using a mask or any other appropriate technique.

The deposit can equally cover the corresponding area, i.e. it has a continuous structure, but it can also have a discontinuous structure for example, having the shape of a frame.

In such a case, an irregular deposit is formed, with its surface remaining sufficient so as to provide the required adhesion of the holding pad.

The discontinuous structure deposits can be obtained through tampography.

According to the invention, the optical lens may be coated on its convex main side (front side), concave main side (back side), or both sides with the stack of coatings or films previously mentioned.

The optical lenses according to the invention generally comprise a hydrophobic and/or oleophobic surface coating and preferably comprise both a hydrophobic and/or an oleophobic surface coating deposited on a mono- or multilayer antireflection coating.

Indeed, hydrophobic and/or oleophobic coatings are generally applied onto lenses comprising an antireflection coating, in particular lenses made of a mineral materials, so as to reduce their strong tendency to staining, for example towards greasy deposits.

The anti-fouling top coat is defined as a hydrophobic and/or oleophobic surface coating. Hydrophobic and/or oleophobic coatings are obtained through the application, generally on the surface of the anti-reflection coating, of compounds reducing the surface energy of the lens. The ones preferably used in this invention are those which reduce surface energy of the article to less than 20 mJ/m$^2$. The invention has a particular interest when using anti-fouling top coats having a surface energy of less than 14 mJ/m$^2$, preferably less than 13 mJ/m$^2$ and even better less than 12 mJ/m$^2$.

Preferably the hydrophobic and/or oleophobic coatings impart to the lens a static water contact angle of at least 90°, preferably at least 100°, more preferably at least 110°.

The anti-fouling top coat according to the invention is preferably of organic nature and preferably comprises at least one fluorinated compound. By organic nature, it is meant a layer which is comprised of at least 40% by weight, preferably at least 50% by weight of organic materials, relative to the total weight of the coating layer.

Hydrophobic and/or oleophobic surface coatings most often comprise silane-based compounds bearing fluorinated groups, in particular perfluorocarbon or perfluoropolyether group(s). By way of example, silazane, or silicon compounds are to be mentioned, comprising one or more fluorine-containing groups such as those mentioned here above. Such compounds have been widely disclosed in the previous art, for example in U.S. Pat. No. 4,410,563, EP-0203730, EP-749021, EP-844265 and EP-933377.

A classical method to form an anti-fouling top coat consists in depositing compounds bearing fluorinated groups and Si—R groups, R representing an —OH group or a precursor thereof, such as —Cl, —NH$_2$, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarbons, perfluorocarbons, fluorinated polyethers such as F$_3$C—(OC$_3$F$_6$)$_{24}$—O—(CF$_2$)$_2$—(CH$_2$)$_2$—O—CH$_2$—Si (OCH$_3$)$_3$ and perfluoropolyethers, in particular perfluoropolyethers.

Among fluorosilanes, there may be cited the compounds having the formulae depicted in WO-2008/141981, which is hereby incorporated by reference. Compositions containing fluorosilanes compounds also useful for making hydrophobic and/or oleophobic top coats are disclosed in U.S. Pat. No. 6,183,872. Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485.

The deposition techniques for such anti-fouling top coats are very diverse, including liquid phase deposition such as dip coating, spin coating (centrifugation), spray coating, or vapor phase deposition (vacuum evaporation). Of which, deposition by spin or dip coating is preferred. Preferably, the coating material for forming the anti-fouling top coat is liquid or can be rendered liquid by heating, thus being in a suitable state for deposition. Deposition is followed by curing.

The liquid coating material for forming the anti-fouling top coat of the invention may comprise one or more of the above cited compounds, for example a mixture of fluorinated compounds such as disclosed in WO-2008/053020 or EP-2078977.

Commercial polymerizable compositions for making anti-fouling top coats are the compositions KY130® (as described in JP-2005-187936), KP 801M® commercialized by Shin-Etsu Chemical or OF110™, and the composition OPTOOL DSX® (a fluorine-based resin comprising perfluoropropylene moieties as described in U.S. Pat. No.

6,183,872) and AES4® commercialized by Daikin Industries. OPTOOL DSX® is the most preferred coating material for anti-fouling top coats.

The antifouling coating can be monolayered or multilayered, i.e., can comprise a stack of several layers of antifouling materials such as described hereabove, in particular two layers. Examples of such multilayer hydrophobic and/or oleophobic coating can be found in WO-2014/102298 and WO-2014/102271.

The hydrophobic and/or oleophobic coating can be a coating made according to the process disclosed in the published international patent application WO-2014/102271, by applying successively a first hydrophobic and a second hydrophobic material having different molecular weight.

The hydrophobic and/or oleophobic coating can be a coating made by applying successively a first hydrophobic material having a first surface energy and a second hydrophobic material having a second surface energy higher than the first surface energy.

Typically, a bilayer hydrophobic and/or oleophobic coating is obtained by depositing OPTOOL DSX™/OF110™ or OF 210™; or AES4™/OF110™ or OF210™.

Generally, the deposited anti-fouling top coat has a physical thickness lower than 30 nm, preferably less than 20 nm, more preferably less than 20 nm, even better less than 10 nm, ideally less than 5 nm. The anti-fouling top coat preferably has a thickness from 1 to 10 nm, more preferably 2 to 5 nm, even better 2 to 4 nm. Control of the deposited thickness can be performed by means of a quartz scale.

The temporary coating generally increases the surface energy of the lens up to a value at least of 15 mJ/m². It is generally directly deposited onto a hydrophobic and/or oleophobic coating.

It can be applied on an area covering the whole of at least one of the two sides of the lens or only on the area intended to be in contact with the holding pad of said lens, and preferably at least covers the central part of the lens.

More precisely, it is usual to deposit the holding pad, associated with the acorn, on the lens convex side. It is therefore possible to cover with the protective coating the whole convex side or, alternatively, only a central area of the convex side, using a mask or any other appropriate technique.

The deposit can equally cover the corresponding area, i.e. it has a continuous structure, but it can also have a discontinuous structure for example, having the shape of a frame. In such a case, an irregular deposit is formed, with its surface remaining sufficient so as to provide the required adhesion of the holding pad. The discontinuous structure deposits can be obtained through pad printing.

However, the area covered by the temporary outer coating (according to the invention) should be such that the contact surface between the protective coating and holding pad is sufficient to provide the adhesion of the lens to the pad.

Generally, the temporary coating covers at least 5%, preferably at least 10%, more preferably at least 15%, much more preferably at least 20%, even better at least 40% and most preferably the whole surface of the lens on which the pad is to be adhered.

As a result of depositing the temporary outer coating, a lens is obtained, being able to be edged. This means that after the edging operation according to the method of the invention, the glass will have the required dimensions allowing to be suitably inserted into the glass frame wherein it is to be arranged such as described for example in FR 2860303.

The removable film has opposite first and second sides, the first side being intended to come into contact with the mechanically degradable outermost layer of a temporary coating.

According to the invention, the first side of the film has a roughness Rq (root mean squared) lower than 750 nm and a surface energy lower than 38 mJ/m².

Roughnesses Rq and surface energies are determined according to the methods indicated in the experimental part.

Preferably, the first side of the removable film has a roughness Rq, less than or equal to 150 nm, even better less than or equal to 100 nm, and ideally less than or equal to 60 nm.

Typically, the roughness Rq is at least 10 nm.

This roughness Rq is measured using a profilometer as defined in the experimental part.

Preferably, the first side of the removable film also has a surface energy of less than or equal to 35 mJ/m², most preferably lower than or equal to 25 mJ/m².

Typically, the surface energy of the first side of the removable film is at least 6 mJ/m².

Preferably, the removable film according to the invention has a low Young's modulus, typically lower than 170 MPa and preferably lower than or equal to 100 MPa, most preferably lower than or equal to 50 MPa, better lower than or equal to 20 MPa, even better lower than or equal to 10 MPa and ideally lower than or equal to 5 MPa.

In preferred embodiments of the invention, the removable film is a plastic film having a low content of plasticizer, namely less than 20 wt %, preferably less than or equal to 10 wt % based on the total weight of the film. Most preferably, the removable film of the invention is totally free of plasticizer.

The removable film according to the invention generally has a thickness ranging from 0.5 micrometer to 1 millimeter.

As already indicated, the removable film can be of uniform shape or has various shapes with cuttings, such as a daisy shape in order to improve conformation ability of the film to the lens surface.

Although the removable film can cover the entire surface area of the outermost layer of the temporary coating, this is not necessary. In fact, depending on the film used, only at least 5% of the surface area of the outermost layer needs to be covered by the removable film.

In an embodiment of the invention, the removable film can be a film wherein the first side of the film, when applied to the outermost layer of the temporary coating, comprises at least one adherent zone and at least one non-adherent zone across a surface portion thereof.

The first side can have on its full surface or only on some zones of said surface the properties of Roughness Rq and surface energy of the invention, so that the surface of these zones, e.g. adherent zones, is sufficient to confer the adhesion of the film on the temporary coating.

These adherent zones of the film provide sufficient adhesion to the temporary coating, preferably to an edging enhancing temporary coating, while protecting this temporary coating from mechanical degradation during storing and handling steps and allowing it to be peeled off without impairing its integrity and its properties.

In particular, the first side of the removable film can have at least one surface portion comprising a plurality of three-dimensional adherent protrusions/peaks extending outwardly from said surface portion, and separated by valleys, the upper surface of the protrusion defining the adherent zone.

In another embodiment the first side of the removable film has no surface portion comprising protrusions.

In a preferred embodiment, the full surface of the first side of the removable film is capable of providing an adhesion as defined above.

Usually, the removable film is made of a polymer or copolymer chosen from polyolefines, fluorinated polymers, and silicone based polymers.

Preferably, the removable film is made of a silicone based polymer comprising siloxane units Si—O—Si—, such as polydialkyl siloxanes, in particular polydimethysiloxane (PDMS).

EXPERIMENTAL PART

1—Material and Methods

Lenses: L1

Organic lenses were prepared bearing hard coat and anti-reflection coating that are coated in said order on the substrate. The deposits were achieved on substrates which are polycarbonate ophthalmic lenses comprising, on both sides, an anti-abrasion coating of the polysiloxane type corresponding to example 3 in the Patent Application EP 614957 in the Applicant's name. The treated lenses were round 65 mm diameter lenses.

Deposit of the Layers/Coatings:

The vacuum treating machine used is a BAK760 from Balzer machine provided with an electron gun, an ion gun of the Mark2 Commonwealth type and an evaporation source with a Joule effect.

The abrasion resistant coated lenses are placed on a carrousel provided with circular openings intended to accommodate the lenses to be treated, the concave side facing the evaporation sources and the ion gun.

A vacuum drawing is performed until a secondary vacuum is reached. Then, a successive evaporation of the materials is performed, with the electron gun or by Joule effect, in the conditions detailed here-under:

The antireflecting (AR) stack applied on the anti-abrasion coating is the following $ZrO_2$ (28 nm)/$SiO_2$ (22 nm)/$ZrO_2$ (68 nm)/indium-titanium oxide (ITO) (6.5 nm)/$SiO_2$ (84 nm).

Then, a layer of OPTOOL DSX® commercialized by Daikin Industries is deposited in the following conditions. A given amount of OPTOOL DSX® is placed in a copper capsule with a 18 mm diameter, in turn placed in a Joule effect crucible (tantalum crucible). A 1 to 5 nm thickness of hydrophobic and oleophobic coating is deposited through evaporation. Setting the deposited thickness is performed by means of a quartz scale.

A layer of OF210® commercialized by Canon Optron is deposited in the same conditions as the Optool DSX®

Deposit of the Temporary Protective Coating:

The temporary coating is then evaporated. The deposited material is a compound with $MgF_2$ formula, having a 1 to 2.5 nm granulometry, sold by Merck Corporation. The evaporation is performed using an electron gun. The deposited programmed thickness is 70 nm, with a deposit speed equal to 0.52 nm/s. Setting the deposited thickness is performed by means of a quartz scale.

The lenses are then subjected to a specific treatment step by MgO evaporation directly on the temporary $MgF_2$ layer, using an electron gun, a MgO layer is vacuum evaporated (from MgO pellets). The deposited programmed thickness is 20 nm with direct deposit on the $MgF_2$ protective layer.

Subsequently, the treatment chamber is set back to atmosphere. The lenses are then turned upside down and the convex side oriented towards the treatment area and subjected to same treatment as the concave face.

| Layer | Programmed Thickness/Obtained Thickness (nm) |
|---|---|
| DSX ® | 25/2-4 |
| OF210 ® | 10/2-4 |
| $MgF_2$ | 70/20 |
| MgO | 20/10 |

Lenses: L2

Organic lenses were prepared bearing hard coat and anti-reflection coating that are coated in said order on the substrate. The deposits were achieved on substrates which are CR 39® (ORMA) ophthalmic lenses comprising, on both sides, an anti-abrasion coating of the polysiloxane type corresponding to example 3 in the Patent Application EP-614957 in the Applicant's name. The treated lenses were round 65 mm diameter lenses.

Deposit of the Layers/Coatings:

The vacuum treating machine used is a BAK760 from Balzer machine provided with an electron gun, an ion gun of the Mark2 Commonwealth type and an evaporation source with a Joule effect. The lenses are placed on a carrousel provided with circular openings intended to accommodate the lenses to be treated, the concave side facing the evaporation sources and the ion gun. A vacuum drawing is performed until a secondary vacuum is reached. Then, a successive evaporation of the materials is performed, with the electron gun or by Joule effect, in the conditions detailed here-under:

The AR stack applied on the anti-abrasion coating is the following $SiO_2$ (150 nm)/$ZrO_2$ (27 nm)/$SiO_2$ (22 nm)/$ZrO_2$ (70 nm)/ITO(6 nm)/$SiO_2$ (85 nm).

Then, a layer of OPTOOL DSX® commercialized by Daikin Industries is deposited in the following conditions. A given amount of OPTOOL DSX® is placed in a copper capsule with a 18 mm diameter, in turn placed in a Joule effect crucible (tantalum crucible). A 1 to 5 nm thickness of hydrophobic and oleophobic coating is deposited through evaporation. Setting the deposited thickness is performed by means of a quartz scale.

Deposit of the Temporary Coating:

The protective layer is then evaporated. The deposited material is a compound with $MgF_2$ formula, having a 1 to 2.5 nm granulometry, sold by Merck Corporation. The evaporation is performed using an electron gun. The deposited programmed thickness is 160 nm, with a deposit speed equal to 0.52 nm/s. Setting the deposited thickness is performed by means of a quartz scale.

The lenses are then subjected to a specific treatment step by MgO evaporation directly on the temporary $MgF_2$ layer, using an electron gun, a MgO layer is vacuum evaporated (from MgO chips (reference 0481263) from UMICORE corporation). The deposited programmed thickness is 27 nm with direct deposit on the $MgF_2$ temporary layer.

Subsequently, the treatment chamber is set back to atmosphere. The lenses are then turned upside down and the convex side oriented towards the treatment area and subjected to same treatment as the concave face.

| Layer | Programmed Thickness/obtained Thickness (nm) |
|---|---|
| DSX ® | 42/4-6 |
| MgF$_2$ | 160/40 |
| MgO | 27/10 |

Tests:

Adhesion Test

The films were manually placed on top of the lens with light pressure. If upon inverting the lens, the film remained it was deemed to have good adhesion. If the film fell, it was deemed to have poor adhesion.

We proceed to a numbering by range of results:

−: spontaneous removal of the film or there is a doubt that the film would adhere on the lens until the end of the storage +: the film adheres on the lens ++: the film adheres on the lens and there is a strong adhesion Removable Protective Film/Removal Test The removable protective films were manually placed on top of the lens with light pressure. After 29 days under tropical conditions (40° C., 85% humidity), all the lenses were removed from the envelopes and the removable films were peeled off manually. The lenses are inspected under a Waldmann lamp. The integrity of the temporary layer is visually inspected by reflection. When the temporary layer is intact, its reflection is purple-blue colored and even on the whole surface. When the temporary layer is altered, its reflection is not uniform and green colored.

Roughness Measurement

A profilometer Tencor P-16+ was used to measure the roughness Rq (root mean squared) of the film. The radius of diamond stylus of the profilometer was 5 μm, and the stylus was in contact constantly with sample. The stylus tracking force was 5 milligrams and the scan was done at 20 μm/s over a length of 0.4 mm. Results are the average of 5 measurements.

Surface Energy

The contact angles have been measured with a DSA 100 Digidrop goniometer from Krüss with 3 liquids: deionized water, ethylene glycol and diiodomethane. The surface energies are calculated according to the two-component Owens-Wendt Rabel-Kaelble model disclosed in the following references: "Estimation of the surface force energy of polymers", Owens D. K., Wendt R. G. (1969) J. Appl. Polym. Sci., 13, 1741-1474; "Dispersion-Polar Surface Tension Properties of Organic Solids", Kaelble, D. H. (1970) J. Adhesion 2, 66-81; "Einige Aspekte der Benetzungstheorie und ihre Anwendung auf die Untersuchung und Veränderung der Oberflächeneigenschaften von Polymeren", Rabel, W. (1971) Farbe und Lack 77, 10, 997-1005.

2—EXAMPLES

Example 1

A 86915K12 film from Mc Master Carr, a silicone film, is deposited onto lens L1 prepared as described previously. The film has a thickness of 0.5 mm, a roughness of 48.8 nm and surface energy of 15.4 mJ/m$^2$. Adhesion of the removable film on temporary coating is tested. The film stay on the lens, so adhesion is good. The film is then peeled off manually and temporary coating is inspected. It was found that outermost layer of the temporary coating was not removed after film was peeled off.

Example 2

A BISCO HT-6240 film from Rogers Corporation, a silicone film, is deposited onto lens L2 prepared as described previously. The film has a thickness of 0.5 mm, a roughness of 43.8 nm and surface energy of 20 mJ/m2. Adhesion is tested. The film stay on the lens, so adhesion is good. The film is then peeled off manually and temporary coating is inspected. It was found that outermost layer of the temporary coating was not removed after film was peeled off.

Example 3

Sylgard™ 184 (Dow Corning) base and curing agent was completely mixed in a beaker at the weight ratio of 10:1, under vigorous stirring. After mixing, it was placed in the vacuum oven for de-airing. The mix was poured into a rectangle glass mold (150 mm*100 mm*1 mm) and placed in the oven for curing at 65° C. for 4 hours. Vacuum was applied again in case air bubble formed during curing. After curing, film was taken out and die cut into a daisy shape.

The obtained casted film Sylgard™ 184 is deposited onto lens L1 prepared as described previously. The film has a roughness of 51.3 nm and surface energy of 9.2 mJ/m$^2$. Adhesion is tested. The film stay on the lens and the adhesion seems to be very good. The film is then peeled off manually and temporary coating is inspected. It was found that outermost layer of the temporary coating was not removed after film was peeled off.

Example 4: Comparative Example

A FT 9205 from Avery Dennison, a polyvinylchloride film, is deposited onto lens L1 prepared as described previously. The film has a Thickness of 0.15 mm, a roughness of 129.8 nm and surface energy of 39.7 mJ/m$^2$. Adhesion is tested. The film stay on the lens, so adhesion is good. The film is then peeled off manually and temporary coating is inspected. It was found that outermost layer of the temporary coating was removed after film was peeled off.

Example 5: Comparative Example

A FT 9205 from Avery Dennison, a polyvinylchloride film, is deposited onto lens L2 prepared as described previously. The film has a thickness of 0.15 mm, a roughness of 129.8 nm and surface energy of 39.7 mJ/m$^2$. Adhesion is tested. The film stay on the lens, so adhesion is good. The film is then peeled off manually and temporary coating is inspected. It was found that outermost layer of the temporary coating was removed after film was peeled off.

Example 6: Comparative Example

A MSC White 84278670 film from MSC, a silicone film, is deposited onto lens L2 prepared as described previously. The film has a thickness of 0.8 mm, a roughness of 797.3 nm and surface energy of 9.3 mJ/m$^2$. Adhesion is tested. The adhesion is weak, and film has a tendency to delaminate from the lens. The film is then peeled off manually and temporary coating is inspected. It was found that outermost layer of the temporary coating was not removed after film was peeled off.

Example 7: Comparative Example

A MSC Translucent 31939168 film from MSC, a silicone film; is deposited onto another lens L2 prepared as described previously. The film has a thickness of 0.8 mm, a roughness of 816.1 nm and surface energy of 9.3 mJ/m$^2$. Adhesion is tested. The adhesion is weak, and film has a tendency to delaminate from the lens. The film is then peeled off manually and temporary coating is inspected. It was found that outermost layer of the temporary coating was not removed after film was peeled off.

Properties of removable films and test results for examples 1 to 7 are gathered in the table below:

|  | Properties | | | | Results | |
| --- | --- | --- | --- | --- | --- | --- |
|  | Thickness (mm) | Young's modulus (Mpa) | Rq (nm) | Surface Energy (mJ/m) | Adhesion on the temporary coating | Removing of the temporary coating |
| Example 1 | 0.5 | 2.05 | 48.8 | 15.4 | + | none |
| Example 2 | 0.5 | NC | 43.8 | 20 | + | none |
| Example 3 | NC | 1.5 | 51.3 | 9.2 | ++ | none |
| Example 4 - Comparative | 0.15 | NC | 129.8 | 39.7 | + | complete |
| Example 5 - Comparative | 0.15 | NC | 129.8 | 39.7 | + | complete |
| Example 6 - Comparative | 0.8 | 4 | 797.3 | 9.3 | − | none |
| Example 7 - Comparative | 0.8 | 3.2 | 816.1 | 9.3 | − | none |

Example 8: Comparative Example

A polyester film, FN005 from Eastman, was tested. The film has a smooth surface, but with higher Young's modulus, 170 MPa, than PDMS film. Such film can make a close contact with lens surface, after strong hand compression. However, for lens with higher base, it becomes harder to deform the film to match the lens curvature. The adhesion is weak, and film has a tendency to delaminate from the lens. This result demonstrates that preferably film Young's modulus should be below at least 170 MPa.

The invention claimed is:

1. An optical lens comprising
   (i) a temporary coating at least partially covering a surface of the lens, said temporary coating comprising an outermost layer mechanically degradable through friction and/or contact;
   (ii) a removable film having opposite first side and second sides which adhere to said outermost layer through its first side, wherein
   the first side of the film has a roughness Rq lower than 750 nm and
   the first side of the film has a surface energy lower than 38 mJ/m$^2$.

2. The optical lens of claim 1, wherein the removable film has a Young's modulus lower than 170 MPa.

3. The optical lens of claim 1, wherein the removable film has a Young's modulus of lower than or equal to 100 MPa.

4. The optical lens of claim 1, wherein the surface energy of the first side of the film is lower than or equal to 35 mJ/m$^2$.

5. The optical lens of claim 1, wherein the removable film is made of a polymer chosen from polyolefin, fluorinated polymer, silicone based polymer.

6. The optical lens of claim 5, wherein the removable film comprises a polydimethyl siloxane (PDMS) polymer.

7. The optical lens of claim 1, wherein the surface roughness Rq of the removable film is less than or equal to 150 nm.

8. The optical lens of claim 1, wherein the thickness of the film is ranging from 0.5 microns to 1 mm.

9. The optical lens of claim 1, wherein the outermost layer of the temporary coating is made of at least one material chosen from metal fluorides, metal oxides, metal hydroxides and mixtures thereof.

10. The optical lens according to claim 9 wherein the metal fluorides are chosen from $MgF_2$, $LaF_3$, $AlF_3$ and $CeF_3$, the metal oxides are chosen from MgO, CaO, $TiO_2$, $Al_2O_3$, $ZrO_2$ and $Pr_2O_3$, and the metal hydroxides are chosen from $Mg(OH)_2$, $Ca(OH)_2$ and $Al(OH)_3$.

11. The optical lens of claim 1, wherein the temporary coating comprises a layer comprising a metallic fluoride and a layer comprising a material selected from the group of metallic oxides, metallic hydroxides or their mixture deposited over said layer of metallic fluorides.

12. The optical lens of claim 1, wherein the temporary coating is formed onto a hydrophobic and/or oleophobic coating.

13. The optical lens of claim 12, wherein the hydrophobic and/or oleophobic coating has a surface energy equal to or lower than 14 mJ/m$^2$.

14. The optical lens of claim 12, wherein the hydrophobic and/or oleophobic coating is obtained by applying successively a first hydrophobic material having a first surface energy and a second hydrophobic material having a second surface energy, wherein the second surface energy is higher than the first surface energy.

15. The optical lens of claim 1, wherein the removable film contains less than 20wt % of plasticizer.

16. The optical lens of claim 1, wherein at least 5% the surface of the outermost layer is covered by the removable film.

17. The optical lens of claim 10, wherein the metal fluoride is $MgF_2$.

18. The optical lens of claim 10, wherein the metal oxide is MgO.

* * * * *